(12) United States Patent
Wibbeler

(10) Patent No.: US 8,839,420 B2
(45) Date of Patent: Sep. 16, 2014

(54) VALIDATION OF FUNCTION CALL PARAMETERS

(75) Inventor: Patrick R. Wibbeler, Rocklin, CA (US)

(73) Assignee: Adobe Systems Incorporated, San Jose, CA (US)

(*) Notice: Subject to any disclaimer, the term of this patent is extended or adjusted under 35 U.S.C. 154(b) by 391 days.

(21) Appl. No.: 12/434,492

(22) Filed: May 1, 2009

(65) Prior Publication Data

US 2014/0033314 A1   Jan. 30, 2014

(51) Int. Cl.
*H04L 29/06* (2006.01)

(52) U.S. Cl.
USPC .......................................................... 726/22

(58) Field of Classification Search
USPC .......................................................... 726/22
See application file for complete search history.

(56) References Cited

U.S. PATENT DOCUMENTS

| | | | |
|---|---|---|---|
| 5,974,549 A * | 10/1999 | Golan | 726/23 |
| 6,018,801 A * | 1/2000 | Palage et al. | 726/2 |
| 6,052,710 A * | 4/2000 | Saliba et al. | 709/203 |
| 6,289,446 B1 | 9/2001 | Nilsson | |
| 6,490,564 B1 | 12/2002 | Dodrill et al. | |
| 7,200,599 B2 * | 4/2007 | Simon et al. | 707/754 |
| 7,305,659 B2 | 12/2007 | Muller et al. | |
| 7,404,193 B2 | 7/2008 | Hen et al. | |
| 2008/0086778 A1 | 4/2008 | Asahara | |
| 2008/0148298 A1 | 6/2008 | Chatterjee et al. | |
| 2008/0282345 A1 | 11/2008 | Beals | |
| 2009/0240928 A1 | 9/2009 | Fischer et al. | |
| 2014/0033276 A1 | 1/2014 | Wibbeler | |

OTHER PUBLICATIONS

"A trusted control model of subject's behaviors based on static measuring" Zheng Zhou ; Bing Deng ; Luping Zhou ; Changwen Qu, Biomedical Engineering and Informatics (BMEI), 2011 4th International Conference Publication Year: 2011 , pp. 2063-2066.*
Dor, Nurit, et al. "Software validation via scalable path-sensitive value flow analysis." ACM SIGSOFT Software Engineering Notes. vol. 29. No. 4. ACM, 2004.*
"U.S. Appl. No. 12/473,591, Response filed Apr. 5, 2013 to Final Office Action rnailed Nov. 5, 2012", 10 pgs.
"U.S. Appl. No. 12/473,591, Response filed Aug. 3, 2012 to Non Final Office Action mailed May 10, 2012", 10 pgs.
"U.S. Appl. No. 12/473,591, Final Office Action mailed Nov. 5, 2012", 13 pgs.
"U.S. Appl. No. 12/473,591, Non Final Office Action mailed Nov. 5, 2012", 10 pgs.
"U.S. Appl. No. 12/473,591, Notice of Allowance mailed Feb. 6, 2014", 7 pgs.

* cited by examiner

Primary Examiner — Harris Wang
(74) Attorney, Agent, or Firm — Schwegman Lundberg & Woessner, P.A.

(57) ABSTRACT

In one embodiment, a method of validating an input parameter to a function call is provided. In this method, the function call for a function is received, and this function call includes an input parameter. A validation rule associated with the function is accessed from a file that is located separately from the function itself. The input parameter then is validated based on the validation rule associated with the function, and the function may then be called based on the validation of the input parameter.

22 Claims, 7 Drawing Sheets

| FUNCTION | INPUT PARAMETER | VALIDATION RULE |
|---|---|---|
| displaymessage() | message | Type = string |
| rectanglearea() | length | Required = Yes<br>Range = 0<L<10000 |
| rectanglearea() | width | Required = Yes |

VALIDATION OF FUNCTION CALL PARAMETERS

FIELD

The present disclosure relates generally to computer security. In one embodiment, the disclosure relates to the validation of function call parameters.

BACKGROUND

A type of attack against an exposed application programming interface (API) is by way of passing invalid input as parameters to API functions. A program application may not properly validate the format or structure of the input, providing a means for an attacker to gain control or access to a system.

Many attackers use a technique called "fuzz" testing to find unvalidated parameters. Attackers automated the generation of invalid input to API functions while monitoring the application for invalid behavior. This makes finding unvalidated parameters trivial.

Currently, to prevent such attacks, the program itself must be updated with a patch that remedies the security breach by adding validation. However, the development of a patch is labor-intensive and can take a long time because, for example, the patch needs to be tested to ensure that the program modification will not create other problems in the program.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

The description that follows includes illustrative systems, methods, techniques, instruction sequences, and computing machine program products that embody various embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

The embodiments described herein provide techniques for validating input parameters to function calls. Before a function is called, input parameters used by a function are initially validated based on validation rules. In an embodiment, as will be explained in more detail below, these validation rules are stored separately from the function such that the validation rules can be updated separately from the function itself. Depending on whether the input parameters are valid, the function may be executed or prevented from being executed.

Figure 1:
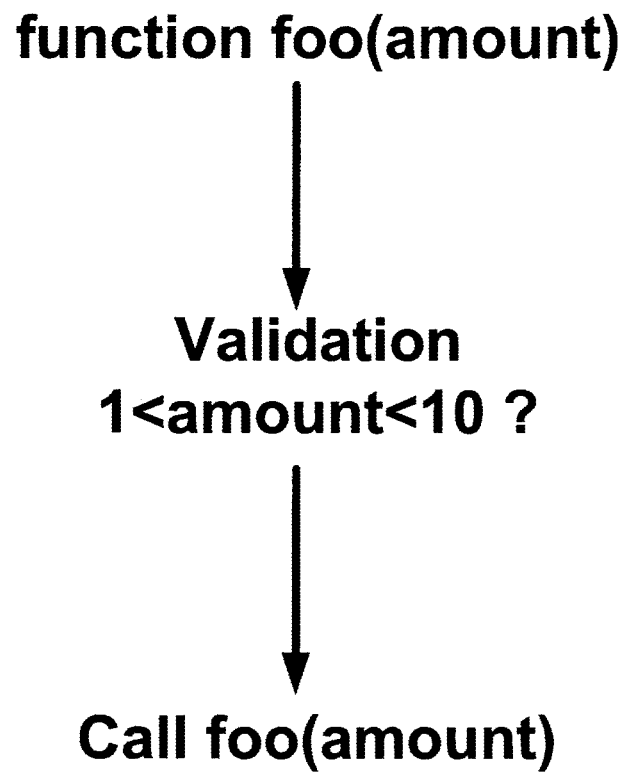
FIG. 1 is a diagram showing a validation of input parameters to a function call consistent with one embodiment.

FIG. 1 is a diagram showing a validation of input parameters to a function call consistent with one embodiment. As depicted in FIG. 1, a function named "foo( )" is called to perform a certain task. A "function," as used herein, refers to a set of prewritten instructions that performs a specific task when executed. Examples of functions include a beep function that can be called to produce a beep sound, a print function that can be called to print a document, a save function that can be called to save a document, and a variety of other functions. It should be appreciated that a function may also be referred to as a program, subroutine, procedure, or routine, and therefore, such terms may be used interchangeably. The function may be compiled resulting from an output of a compiler where the set of instructions is in machine language or other assembly language program. Alternatively, the function may be directly interpreted by an interpreter where the set of instructions is in scripting language or in extension language. The function may be exposed or made available for execution by way of, for example, a dynamic link library (DLL) or an application programming interface (API). A function exposed by way of the API may be referred to as an "API function." The function may take in input parameters to perform a task.

An "input parameter," refers to a variable that is given a specific value during the execution of the function. In the example of FIG. 1, the function "foo( )" receives or takes in an input parameter by the name of "amount." This input parameter "amount" is first validated before it is called and executed. In general, validation is the process of ensuring that a function operates on correct, secure, and/or useful data (or input parameters). Here, input parameters are validated to ensure that, for example, they will not cause the function to break or cause any error. Validation uses validation rules that check for correctness, security, and/or usefulness of data that is input to the system. As explained in more detail below, the input parameter "amount" may be subjected to a variety of different types of validation rules, which are described in more detail below. In the example of FIG. 1, a value assigned to the input parameter "amount" is checked to see whether it falls between the values 1 and 10. If the input parameter "amount" falls between the values 1 and 10, then the input parameter "amount" is valid and, as a result, the function "foo( )" is executed based on this input parameter "amount." On the other hand, if the input parameter "amount" falls outside the values between 1 and 10, then the input parameter "amount" is invalid and, as a result, the function "foo( )" is prevented from being executed.

In accordance with an embodiment, as explained in more detail below, the validation rules are located or stored separately from the function "foo( )." Unlike the function "foo( )," these validation rules can be edited with a variety of different document editing applications and, therefore, the validation rules can be updated, for example, without patching the functions. It should be noted that a patch is a small piece of software designed update a function by, for example, modifying the function's binary executable.

Figure 2:
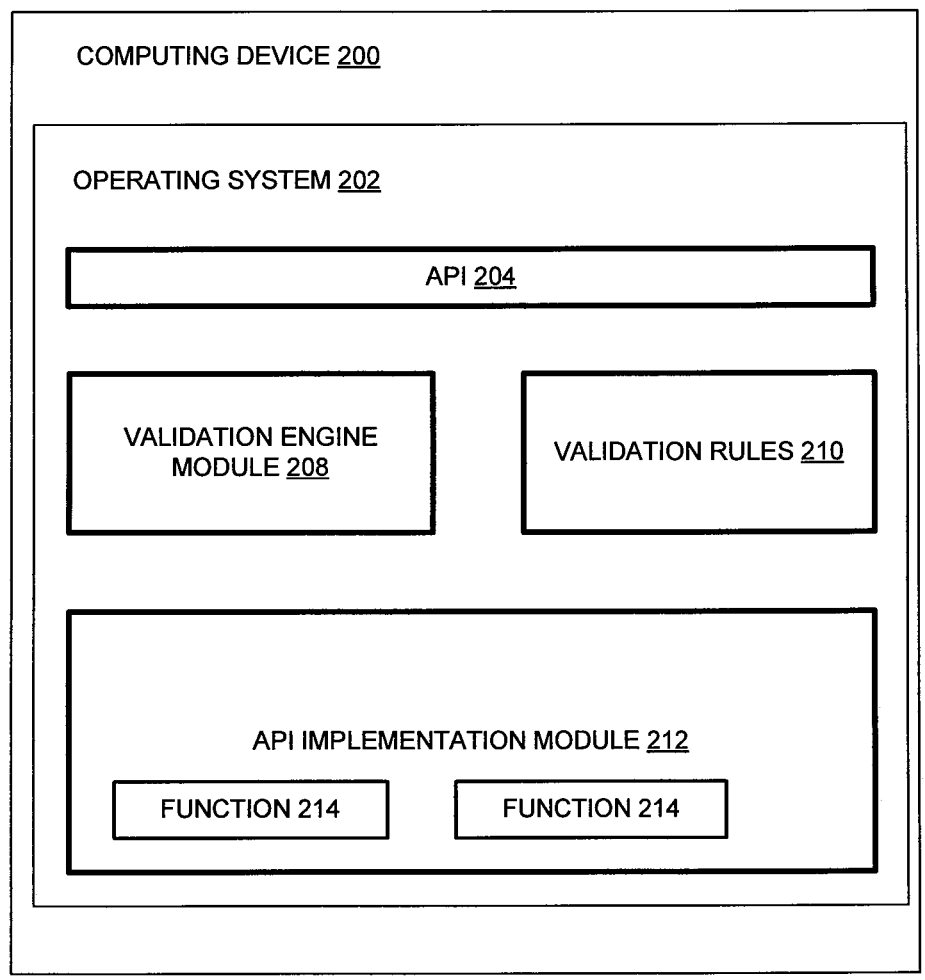
FIG. 2 is a block diagram showing various modules, in accordance with an embodiment, included in a computing device that is configured to validate input parameters to function calls.

FIG. 2 is a block diagram showing various modules, in accordance with an embodiment, included in a computing device 200 that is configured to validate input parameters to function calls. It should be appreciated that the computing device 200 may be deployed in the form of, for example, personal computers, laptop computers, server computers, tablet personal computers, set-up boxes, mobile phones, personal digital assistants, and other computing devices. In various embodiments, the computing device 200 may be used to implement computer programs, logic, applications, methods, processes, or software to input parameters to function calls, as described in more detail below.

The computing device 200 executes an operating system 202 that manages the software processes and/or services executing on the computing device 200. As depicted in FIG. 2, these software processes and/or services may include an API 204, a validation engine module 208, and an API implementation module 212. Additionally, the computing device 200 stores validation rules 210 that are used by the validation engine module 208.

The API 204 is an interface by which an application program accesses services. For example, the API 204 specifies an interface and controls the behavior of objects specified in that interface. In particular, function calls may be made through the API 204 and, in turn, the API 204 transmits the function calls to the validation engine module 208. The API implementation module 212 stores the various functions 214, which may be called by the API 204 to perform various tasks, and also executes the various functions 214 when called. A script interpreter is an example of the API implementation module 212.

Before one or more functions 214 are executed, the validation engine module 208 is configured to validate input parameters to function calls passed from the API 204 and also configured to call the functions based on the validation. In particular, the validation engine module 208 is configured to validate by checking the input parameters to the function calls based on the validation rules 210. These validation rules 210 are stored in a file and, as depicted in FIG. 2, this file is located separately from the functions 214. That is, the file is stored separately from the functions 214. As an example, the file with the validation rules 210 can be located in one location of a nonvolatile memory while the functions 214 stored in the API implementation module 212 are located in a different location (as identified by a different memory address) of the same nonvolatile memory.

It should be appreciated that in other embodiments, the computing device 200 may include fewer, more, or different modules apart from those shown in FIG. 2. For example, in an alternate embodiment, the API 204 may be integrated with the API implementation module 212 to form a single module.

Figure 3:
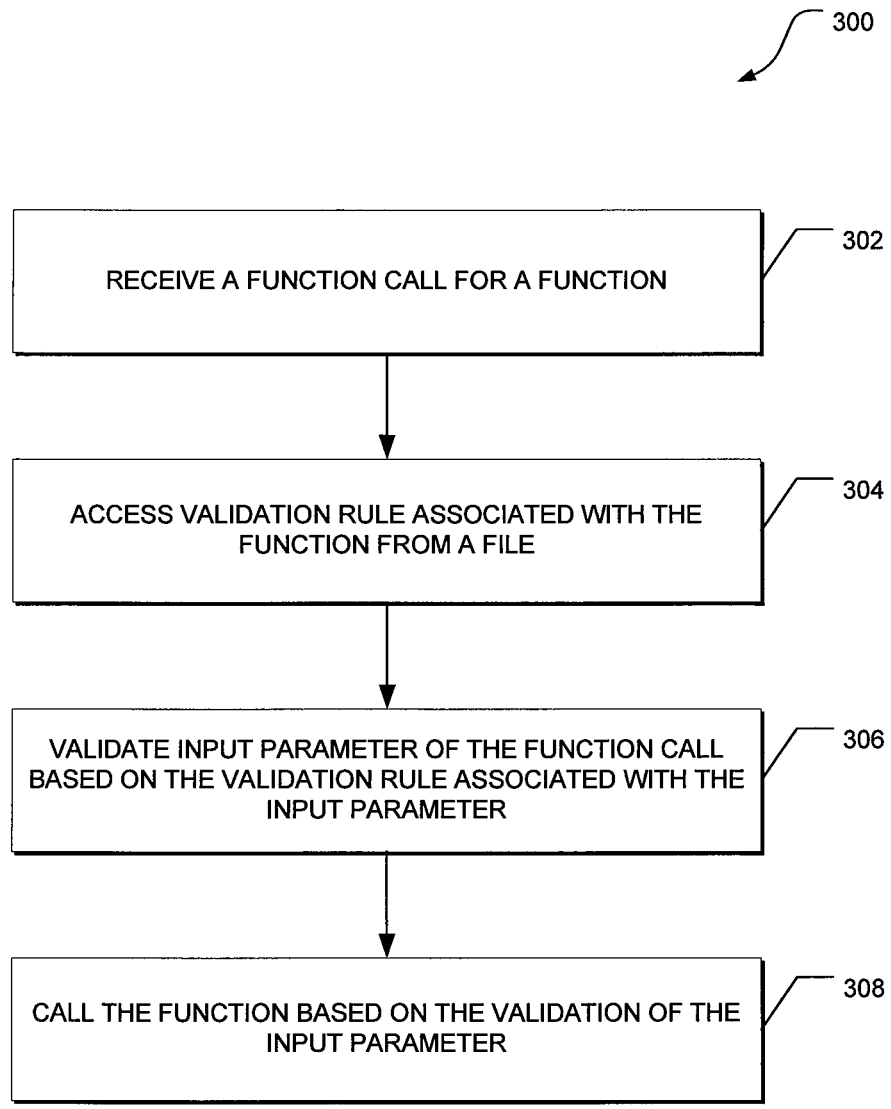
FIG. 3 is a flow diagram of a general overview of a method, in accordance with an embodiment, for validating input parameters to function calls.

FIG. 3 is a flow diagram of a general overview of a method 300, in accordance with an embodiment, for validating input parameters to function calls. In an embodiment, the method 300 may be implemented by the validation engine module 208 and employed in the computing device 200 of FIG. 2. As depicted in FIG. 3, a function call for a function is received at 302 and this function call includes at least one input parameter. Upon receipt of the function call, one or more validation rules associated with the function are accessed at 304 from a file that includes validation rules associated with multiple functions. Consistent with embodiments, this file is located or stored separately from the function. The file may be stored at a variety of different locations within a file system or even outside of the file system. For example, the file may be a registry file that stores settings and options for an operating system. In another example, the file may be stored in a particular nonvolatile memory of a computing device that is specifically configured to store this file (e.g., an Electrically Erasable Programmable Read-Only Memory (EEPROM)).

After the validation rules associated with the function are accessed from the file, the input parameter included in the function call is validated at 306 based on at least one validation rule that is associated with the input parameter. If the validation identifies the input parameter to be valid or acceptable, then the function requested by the function call is called at 308. The function is called by passing the input parameter to the function, thereby resulting in the execution of the function. On the other hand, if the validation identifies that the input parameter is invalid or unacceptable, then the function is prevented from being called such that the non-execution of the function may avoid, for example, the introduction of potential errors and thereby reduces the likelihood of a security breach.

Figure 4:
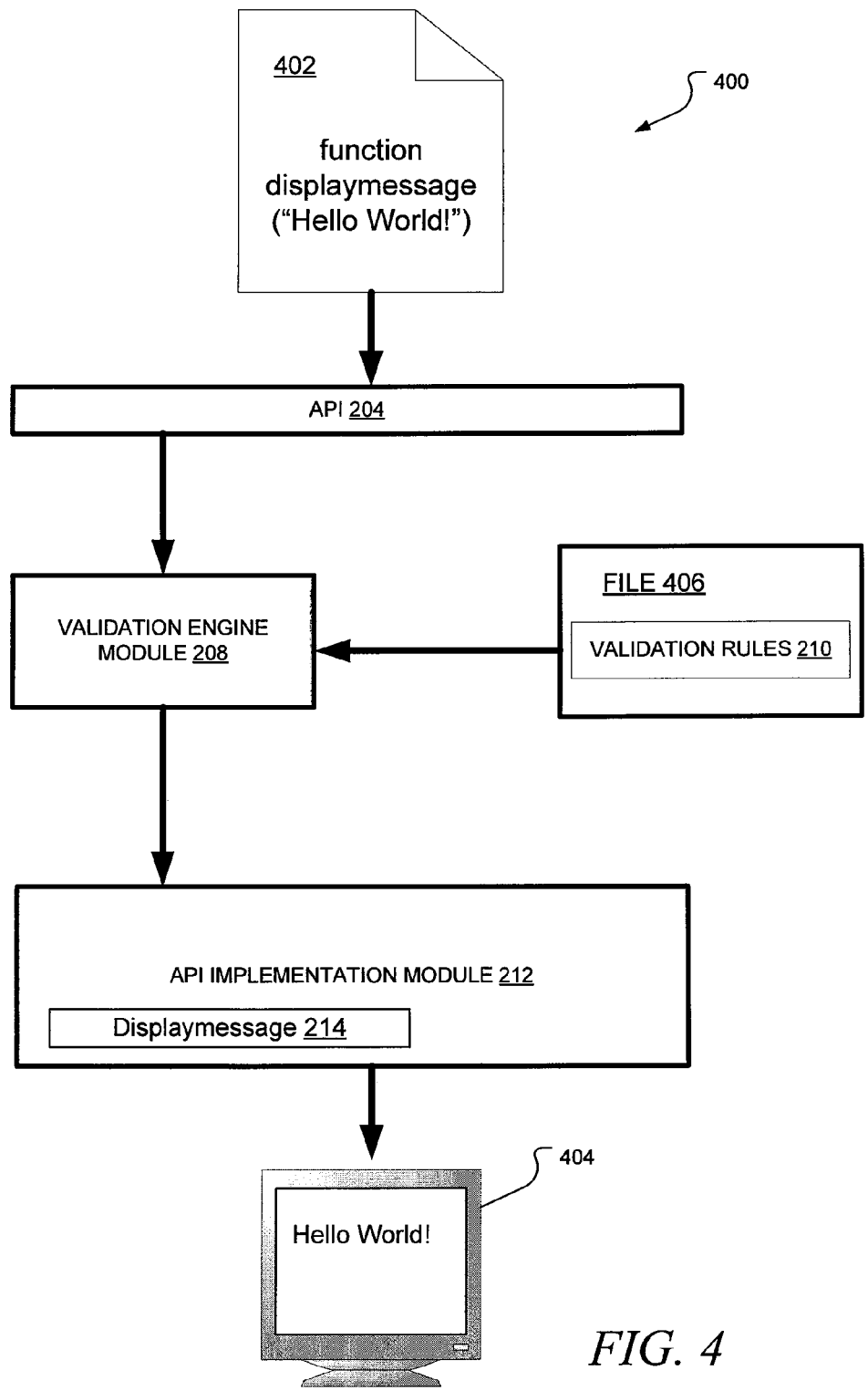
FIG. 4 is a block diagram showing an example of an illustrative system for validating input parameters to a function call, consistent with an embodiment.

FIG. 4 is a block diagram showing an example of an illustrative system 400 for validating input parameters to a function call, consistent with an embodiment. The system 400 includes a document 402, an API 204, a validation engine module 208, a file 406 that includes validation rules 210, an API implementation module 212, and a monitor 404.

The document 402 includes a function call for an exposed function named "displaymessage( )" 214, which is stored in the API implementation module 212. As used herein, a "document" refers to electronic media content that is accessible by computer technology. For example, the document 402 can be a file that is not an executable file or a system file and includes data for use by a computer program. Examples of the document 402 include a single or multiple files that are accessible by and/or associated with electronic document processing applications such as word processing applications, document viewers, email applications, presentation applications, spreadsheet applications, diagramming applications, graphic editors, graphic viewers, enterprise applications, and other applications. The document 402 may be composed of alphanumeric texts, symbols, images, videos, sounds, and other data. It should be appreciated that the document 402 can have a variety of file formats that, for example, may be identified by data within the document 402 and/or by the filename extension. Examples of file formats that may be associated with document 402 include Adobe Portable Document Format (PDF), Microsoft DOC format, Hypertext Markup Language (HTML) format, Extensible Markup Language (XML) format, Microsoft XLS format, and Tag Image File Format (TIFF).

In the example of FIG. 4, the function call for the exposed function "displaymessage( )" 214 includes an input parameter "Hello World!" The API 204 receives the function call and passes it to the validation engine module 208. In an embodiment, the validation engine module 208 accesses the file 406, which includes the validation rules 210, upon receipt of the function call. In an alternate embodiment, the validation engine module 208 can access this file 406 and load it in memory before receipt of the function call. From this file, a validation rule associated with the particular function "displaymessage( )" 214 is accessed or retrieved from the file 406, and the validation engine module 208 then validates the input parameter "Hello World!" based the validation rule.

If the validation engine module 208 identifies the input parameter "Hello World!" to be valid, then the validation engine module 208 calls the exposed function "displaymessage( )" 214 by passing the function call (and the input parameter "Hello World!") to the API implementation module 212.

The API implementation module 212 in turn executes the exposed function "displaymessage( )" 214. As depicted in FIG. 4, the execution of the function "displaymessage( )" 214 results in the rendering or display of the message "Hello World!" on the monitor 404. On the other hand, if the validation engine module 208 identifies the input parameter "Hello World!" to be invalid, then the validation engine module 208 prevents the function "displaymessage( )" 214 from being called by, for example, not calling the function "displaymessage( )" 214.

Figure 5:
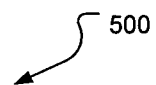
FIG. 5 is a diagram showing a data structure, in accordance with an example of an embodiment, that is configured to store validation rules.

FIG. 5 is a diagram showing a data structure 500, in accordance with an example of an embodiment, that is configured to store validation rules. The validation rules are included in a file, which is located separately from the functions. Since the file is stored separately from the functions, the validation rules can be modified separately from the functions. Therefore, unlike the functions, the validation rules may be updated without a patch. For example, in an embodiment, the validation rules may be stored as ASCII text or other formats that are editable by a word processor, spreadsheet application, database application, or other applications. As a result, if a bug that exploits the function is identified, the validation rules can be updated in the file without modifying or patching the function. To update the file, a computing device, for example, may download the latest set of validation rules from a server and replace the existing validation rules in the file with the downloaded set of validation rules. Alternatively, a user can also manually update or edit the validation rules in the file with the use of a variety of different document editing applications.

In one embodiment, the file may be a data structure 500 that is configured to store the validation rules. In general, the data structure 500 provides context for the organization of data. Examples of data structures include tables, arrays, linked lists, databases, and other data structures. In addition to the validation rules, the data structure 500 may include the input parameters (or identifiers that identify the input parameters), functions (or identifiers that identifies the functions), and/or associations between the input parameters and the validation rules. For example, as depicted in FIG. 5, the data structure 500 is in the form of a table that stores the validation rules and their associated input parameters and/or functions. The table is organized in rows and columns. The elements associated with the column "validation rule" include the validation rules. The elements associated with the column "function" include the names of the functions associated with the validation rules. The elements associated with the column "input parameter" include the names of the input parameters associated with the validation rules.

The associations can be identified by the placement or organization of the functions, input parameters, and/or validation rules. In this table, elements across the same row are associated with each other. For example, the validation rule "Type=string" is associated with the function "displaymessage( )" and associated with the input parameter "message." Similarly, the validation rule "Required=Yes" is associated with the function "rectanglearea( )" and associated with the input parameter "width."

There are a variety of different validation rules. For example, one validation rule identifies a parameter type used by the function. A "parameter type," as used herein, refers to a classification of a type or kind of data. Examples of parameter types include string, floating-point, integer, date, time, and Boolean. In the example depicted in FIG. 5, the validation rule associated with the function "displaymessage( )" and the input parameter "message" defines a pre-defined parameter type "string." Here, the validation of the input parameter "message" includes an identification that a parameter type of a received input parameter matches the predefined parameter type "string." If the parameter type is not a string (e.g., an integer), then the function "displaymessage( )" cannot accept this parameter type and, therefore, this input parameter is invalid. Conversely, the validation rule may also identify the parameter type to include all parameter types except the one defined by the validation rule. For example, the validation rule may instead be interpreted as to include every parameter type except for the predefined parameter type "string." Therefore, parameter types such as integer and floating-point, which are a mismatch to the predefined parameter type "string," are acceptable to the function "displaymessage( )" and can be identified as being valid.

A second example of a validation rule defines a particular parameter range. A "parameter range," as used herein, refers to limits between which variation of the input parameter is possible. The validation of the input parameter includes identifying the input parameter to be within or outside of the parameter range. In the example of FIG. 5, the function "rectanglearea( )" calculates an area of a rectangle based on the input parameters "length" and "width." The validation rule associated with the input parameter "length" defines the parameter range between 0 and 10,000. If the input parameter "length" is a value that falls between 0 and 10,000, then the input parameter is valid. On the other hand, if the input parameter is identified to be outside this parameter range, then the input parameter may be invalid. Conversely, in another example, if the input parameter "length" is a value that falls between 0 and 10,000, then the input parameter can also be invalid. If the input parameter is identified to be outside this parameter range, then the input parameter can also be valid. In addition to numbers, it should be appreciated that the parameter range may also apply to, for example, a character count. For example, a validation rule may define an input parameter to be a string of 100 or fewer characters.

A third example of a validation rule defines a requirement of the input parameter. That is, the validation rule defines whether the received input is necessary for the function. The validation of the parameter includes identifying the inclusion or exclusion of the parameter. In the example of FIG. 5, the validation rules associated with the "length" and "width" input parameters define that both of these input parameters are necessary for the function "rectanglearea( )," as an area of a rectangle cannot be calculated without both the length and the width. If the function call for the function "rectanglearea( )" includes both the "length" and "width," then the validation identifies that they are both included and as a result, the input parameters are valid. On the other hand, if either the input parameter "length" or "width" is excluded from the function call, then the validation identifies that one of the input parameters is invalid.

A fourth example of the validation rule defines a predefined structure of the input parameter. A "structure," as used herein, refers to a programming language construct. For example, the structure may refer to a class that is used as a blueprint to create objects. In another example, the structure may refer to a structure of an object (e.g., structure of object descriptions). This validation includes the identification that the structure of the input parameter matches or mismatches the predefined structure. For example, if the input parameter of a JavaScript Object has a structure:

```
{
    port: 8080,
```

```
                path: "/somefile.html"
            },
``` while the validation rule defines a different predefined structure, such as:

```
            {
                url: "http://someurl",
                port: 8080,
                path: "/somefile.html"
            },
``` then the two structures are a mismatch because the omission of the "url" from the input parameter. Accordingly, the input parameter is invalid.

A fifth example of the validation rule defines a predefined format of the input parameter. The validation of the parameter includes identifying the match or mismatch of the input parameter's format. For example, the validation rule may define or specify a string format to include only printable characters (as opposed to control characters). In another example, the validation rule may define or specify a string format that represents a valid a path or Uniform Resource Locator (URL).

Figure 6:
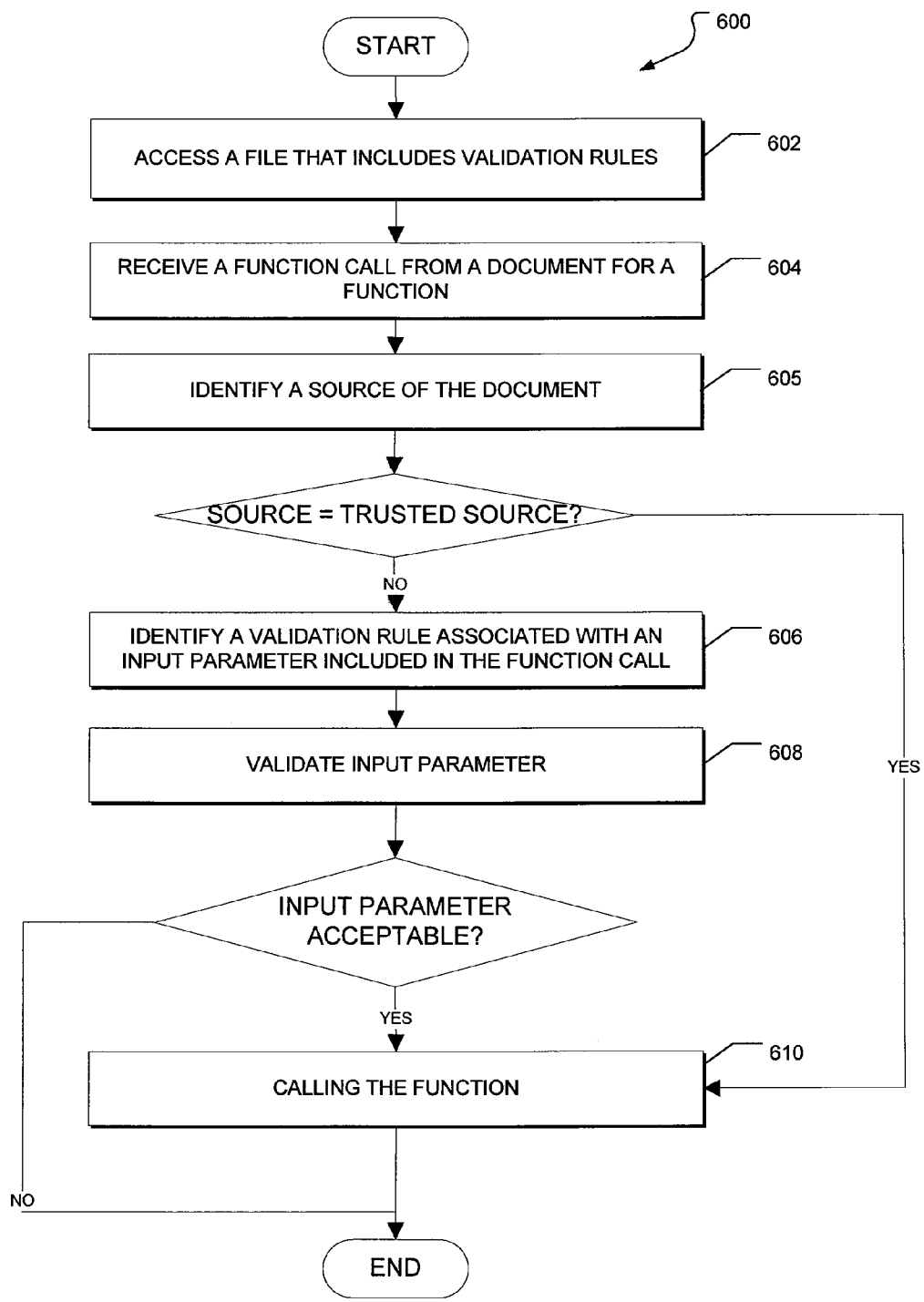
FIG. 6 is a flow diagram showing a detailed method, in accordance with an embodiment, for validating input parameters to function calls.

FIG. 6 is a flow diagram showing a detailed method 600, in accordance with an embodiment, for validating input parameters to function calls. In an example embodiment, method 600 may be implemented by the API 204, validation engine module 208, and/or the API implementation module 212, and employed in the computing device 200 of FIG. 2. As depicted in FIG. 6, the validation engine module accesses at 602 a file that includes validation rules. In this example, a document includes a function call for a particular function, and this function call includes at least one input parameter to the function. At 604, the validation engine module receives this function call from the API, but before validation, the validation engine module can also be configured to identify a source of the document at 605, consistent with an alternative embodiment. The source may be, for example, a particular storage location (e.g., a secured server) or a particular author of the document. The identification may, for example, include comparing the source with a list of trusted sources. If the validation engine module identifies the source to be from a trusted source, then the validation engine module directly calls the function at 610 without validating the input parameter.

On the other hand, if the validation engine module identifies the source to be not from a trusted source, then the validation engine module first validates the input parameter before calling the function. With the file loaded in memory, the validation engine module identifies a validation rule associated with the input parameter at 606 and validates the input parameter based on the identified validation rule at 608. If the input parameter is invalid, then the validation engine module prevents the function from being called by not calling the function as requested by the function call. On the other hand, if the input parameter is valid, then the validation engine module calls the function at 610 by passing the function call with the input parameter to the API implementation module, which executes the function.

Figure 7:
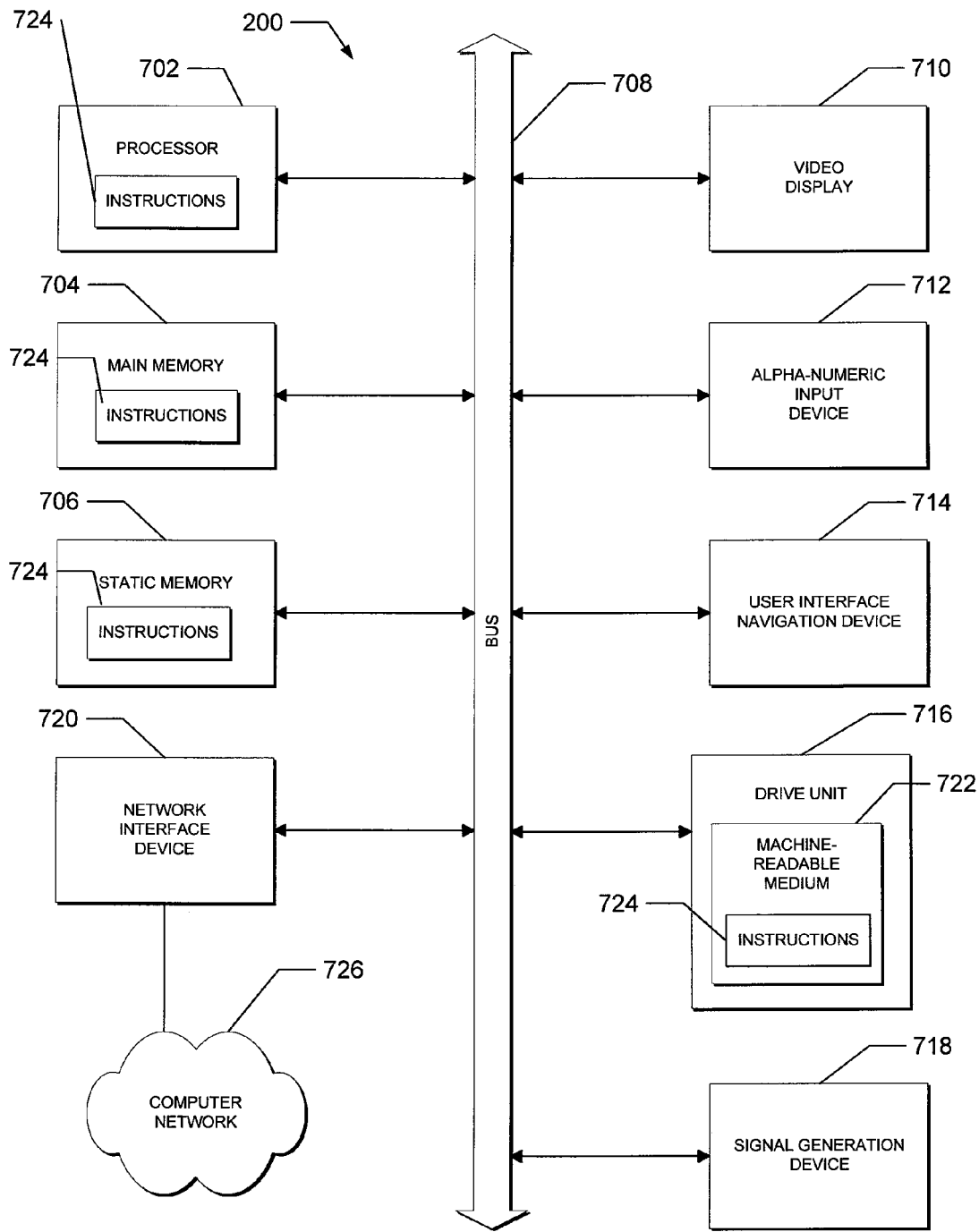
FIG. 7 is a block diagram of a machine in the example form of a computing device within which a set of instructions, for causing the machine to perform any one or more of the methodologies discussed herein, may be executed.

FIG. 7 is a block diagram of a machine in the example form of a computing device 200 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Embodiments may also, for example, be deployed by Software-as-a-Service (SaaS), Application Service Provider (ASP), or utility computing providers, in addition to being sold or licensed via traditional channels. Further, while only a single machine is illustrated, the term "machine" shall also be taken to include any collection of machines that individually or jointly execute a set (or multiple sets) of instructions to perform any one or more of the methodologies discussed herein.

The example of the computing device 200 includes a processor 702 (e.g., a central processing unit (CPU), a graphics processing unit (GPU) or both), a main memory 704, and a static memory 706, which communicate with each other via bus 708. The computing device 200 may further include a video display unit 710 (e.g., a plasma display, a liquid crystal display (LCD) or a cathode ray tube (CRT)), an alphanumeric input device 712 (e.g., a keyboard), a user interface (UI) navigation device 714 (e.g., a mouse), a disk drive unit 716, a signal generation device 718 (e.g., a speaker), and a network interface device 720.

The disk drive unit 716 includes machine-readable medium 722 on which is stored one or more sets of instructions and data structures (e.g., software 724) embodying or utilized by any one or more of the methodologies or functions described herein. The software 724 may also reside, completely or at least partially, within the main memory 704 and/or within the processor 702 during execution thereof by the computing device 200, where the main memory 704 and the processor 702 also constituting machine-readable, tangible media. The software 724 may further be transmitted or received over a computer network 726 via network interface device 720 utilizing any one of a number of well-known transfer protocols (e.g., HTTP).

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Modules can provide information to, and receive information from, other hardware modules. For example, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

While the embodiment(s) is (are) described with reference to various implementations and exploitations, it will be understood that these embodiments are illustrative and that the scope of the invention(s) is not limited to them. In general, techniques for validating input parameters to function calls may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A computer-implemented method comprising:
receiving a document that includes a function call for a function and an input parameter to the function;
identifying a source of the document that includes the function call and the input parameter, the source comprising a particular storage location;
comparing the source of the document that includes the function call and the input parameter against a list of trusted sources that includes trusted storage locations to determine trustworthiness of the source by determining whether the particular storage location is included in the list of trusted sources;
based on the comparing indicating that the particular storage location is not included in the list of trusted sources:
accessing a validation rule associated with the function from a file that is located separately from the function;
using at least one processor, validating the input parameter in the document based on the validation rule associated with the function; and
calling the function based on the validation of the input parameter; and
based on the comparing indicating that the particular storage location is included in the list of trusted sources, calling the function without validating the input parameter.

2. The method of claim 1, wherein the calling of the function comprises passing the input parameter to the function.

3. The method of claim 1, wherein the validation rule defines a predefined parameter type and the input parameter being associated with a parameter type, and wherein the validation of the input parameter comprises identifying the parameter type to match the predefined parameter type.

4. The method of claim 1, wherein the validation rule defines a parameter range, and wherein the validation of the input parameter comprises identifying the input parameter to be within the parameter range.

5. The method of claim 1, wherein the validation rule defines a requirement of the input parameter, and wherein the validation of the input parameter comprises identifying an inclusion of the input parameter in the function call.

6. The method of claim 1, wherein the validation rule defines a predefined structure and the input parameter having a structure, and wherein the validation of the input parameter comprises identifying the structure to match the predefined structure.

7. The method of claim 1, wherein the file is a table configured to store the validation rule associated with the function.

8. The method of claim 1, wherein the validation rule is updatable without modifying the function.

9. The method of claim 1, wherein the file and the function are stored in a non-volatile memory, the file being located in a location of the non-volatile memory and the function being located in a different location of the non-volatile memory.

10. A non-transitory, machine-readable medium that stores instructions, which when performed by a machine, cause the machine to perform operations comprising:
accessing a data structure configured to include a validation rule associated with an application programming interface (API) function, the data structure being stored separately from the API function;
receiving a document that includes a function call for the API function from an API, the document including an input parameter to the API function;
identifying the validation rule associated with the input parameter from the data structure;
identifying a source of the document that includes the function call and the input parameter, the source comprising a particular storage location;
comparing the source of the document that includes the function call and the input parameter against a list of trusted sources that includes trusted storage locations to determine trustworthiness of the source by determining whether the particular storage location is included in the list of trusted sources;
based on the comparing indicating that the particular storage location is not included in the list of trusted sources, validating the input parameter in the document before execution of the API function based on the validation rule associated with the API function; and
calling the API function based on the validation identifying the input parameter being valid; and
based on the comparing indicating that the particular storage location is included in the list of trusted sources, calling the API function without validating the input parameter.

11. The non-transitory, machine-readable medium of claim 10, wherein the instructions, when performed by the machine, cause the machine to perform operations further comprising preventing calling of the API function based on the validation identifying the input parameter being invalid.

12. The non-transitory, machine-readable medium of claim 10, wherein the validation rule is updatable without patching the API function.

13. The non-transitory, machine-readable medium of claim 10, wherein the data structure includes a plurality of input parameters, a plurality of validation rules, and a plurality of associations between each of the plurality of input parameters and each of the plurality of validation rules.

14. A computing device comprising:
at least one processor; and
a memory in communication with the at least one processor, the memory being configured to store an application programming interface (API) and a validation engine module that are executable by the at least one processor,
the API having instructions, that when executed by the at least one processor, cause operations to be performed, comprising transmitting a document that includes a function call for an API function to the validation engine module, the document including an input parameter,
the validation engine module having instructions, that when executed by the at least one processor, cause operations to be performed, comprising
receiving the document that includes the function call and the input parameter,
accessing a validation rule associated with the API function from a file that is stored separately from the API function,
identifying a source of the document that includes the function call and the input parameter, the source comprising a particular storage location,
comparing the source of the document that includes the function call and the input parameter against a list of trusted sources that includes trusted storage locations to determine trustworthiness of the source by determining whether the particular storage location is included in the list of trusted sources,
based on the comparing indicating that the particular storage location is not included in the list of trusted sources,
validating the input parameter in the document based on the validation rule associated with the API function, and
preventing a call of the API function based on the validation identifying the input parameter being invalid.

15. The computing device of claim 14, wherein the memory is further configured to store an API implementation module that is executable by the at least one processor,
the validation engine module having instructions, that when executed by the at least one processor, cause operations to be performed, further comprising calling the API function based on the validation identifying the input parameter being valid, and
the API implementation module having instructions, that when executed by the at least one processor, cause operations to be performed, comprising executing the API function with the input parameter based on receipt of the function call.

16. The computing device of claim 14, wherein the validation rule defines a predefined parameter type and the input parameter being associated with a parameter type, and wherein the validation of the input parameter comprises identifying the parameter type to mismatch the predefined parameter type.

17. The computing device of claim 14, wherein the validation rule defines a parameter range, and wherein the validation of the input parameter comprises identifying the input parameter to be outside the parameter range.

18. The computing device of claim 14, wherein the validation rule defines a requirement of the input parameter, and wherein the validation of the input parameter comprises identifying an exclusion of the input parameter in the function call.

19. The computing device of claim 14, wherein the validation rule defines a predefined format and the input parameter having a format, wherein the validation of the input parameter comprises identifying the format to mismatch the predefined format.

20. The method of claim 1, wherein the particular storage location comprises a secured server.

21. The method of claim 1, wherein the source comprises a particular author of the document and wherein the comparing of the source of the document that includes the input parameter and the function call comprises comparing the document against a list of trusted authors.

22. The method of claim 1, wherein the source comprises a physical source and wherein the comparing of the source of the document that includes the input parameter and the function call comprises comparing the document against a list of trusted physical sources.

* * * * *